United States Patent Office 3,179,660
Patented Apr. 20, 1965

3,179,660
13β-n-PROPYL-18-NOR-CORTISONE DERIVATIVE AND PROCESS OF PREPARATION
Gerard Nominé, Noisy-le-Sec, Robert Bucourt, Clichy-sous-Bois, and André Pierdet, Noisy-le-Sec, France, assignors to Roussel-UCLAF, Paris, France, a corporation of France
No Drawing. Filed Dec. 3, 1963, Ser. No. 327,798
Claims priority, application France, July 26, 1963, 942,825
19 Claims. (Cl. 260—239.55)

The present invention relates to new steroid derivatives, as well as the process of preparing these compounds. The invention has more particularly for its object as novel industrial products, 13β-n-propyl-18-nor-hydrocortisone (or 17-(1'-oxo-2'-hydroxy)-ethyl-10β-methyl-13β - n - propyl-Δ⁴-gonene-11β,17α-diol-3-one), and esters and ethers in the 21-position of the compound. These compounds are represented by the formula

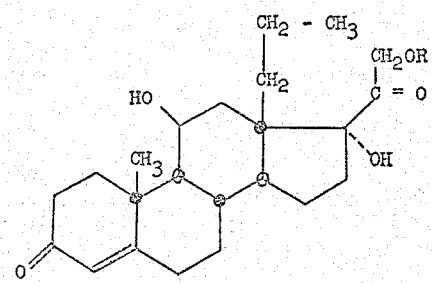

wherein R is selected from the group consisting of hydrogen, the acyl radical of an organic carboxylic acid having from 1 to 18 carbon atoms, the acyl radical of a mineral acid and alkyl having from 1 to 18 carbon atoms.

This application is a continuation-in-part application of our copending application Serial No. 174,252, filed February 19, 1962, now U.S. Patent No. 3,119,841.

The new compounds of the invention possess useful therapeutic properties. These compounds and, in particular, the 21 acetate of 13β-n-propyl-18-nor-hydrocortisone, are endowed particularly with a cortisonic activity and present in particular a ratio of $$\frac{\text{anti-inflammatory activity}}{\text{corticomineraloid activity}}$$

which is favorably modified in comparison with that of hydrocortisone.

The invention has for one of its objects the production of a compound of the formula

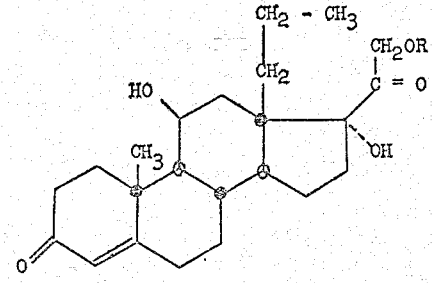

wherein R is selected from the group consisting of hydrogen, the acyl radical of an organic carboxylic acid having from 1 to 18 carbon atoms, the acyl radical of a mineral acid and alkyl having from 1 to 18 carbon atoms.

In particular, the invention has for one of its objects the production of a compound of the formula

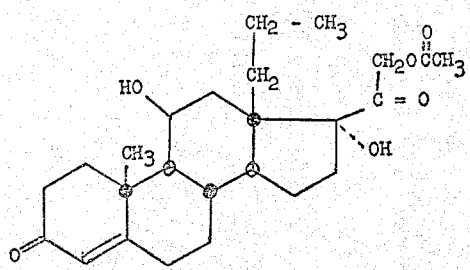

A further object of the invention is the production of novel intermediate compounds:

(a) 9α-bromo-10β-methyl-13β-n-propyl-Δ⁴-gonene-11β-ol-3,17-dione,
(b) 9α-bromo-10β-methyl-13β-n-propyl-Δ⁴-gonene-3,11,17-trione,
(c) 10β-methyl-13β-n-propyl-Δ⁴-gonene-3,11,17-trione,
(d) 3-ethoxy-10β-methyl-13β-n-propyl-Δ³,⁵-gonadiene-11,17-dione,
(e) 3-ethoxy-10β-methyl-13β-n-propyl-17α-ethynyl-Δ³,⁵-gonadiene-17β-ol-11-one,
(f) 10β-methyl-13β-n-propyl-17α-ethynyl-Δ⁴-gonene-17β-ol-3,11-dione,
(g) 10β-methyl-13β-n-propyl-17α-vinyl-Δ⁴-gonene-17β-ol-3,11-dione,
(h) 10β-methyl-13β-n-propyl-17-(2'-bromo)-ethylidene-Δ⁴-gonene-3,11-dione,
(i) 10β-methyl-13β-n-propyl-17-(2'-acetoxy)-ethylidene-Δ⁴-gonene-3,11-dione,
(j) 3-ethylenedioxy-10β-methyl-13β-n-propyl-17-(2'-acetoxy)-ethylidene-Δ⁵-gonene-11-one,
(k) 3-ethylenedioxy-10β-methyl-13β-n-propyl-17-(2'-hydroxy)-ethylidene-Δ⁵-gonene-11β-ol,
(l) 3-ethylenedioxy-10β-methyl-13β-n-propyl-17-(2'-acetoxy)-ethylidene-Δ⁵-gonene-11β-ol,
(m) 3-ethylenedioxy-10β-methyl-13β-n-propyl-17-(1'-oxo-2'-acetoxy)-ethyl-Δ⁵-gonene-11β,17α-diol.

Another object of the invention is the development of a process for the production of the said 13β-n-propyl-18-nor-hydrocortisone and its esters and ethers in the 21-position.

These and other objects of the invention will become more apparent as the description thereof proceeds.

The compound of the formula

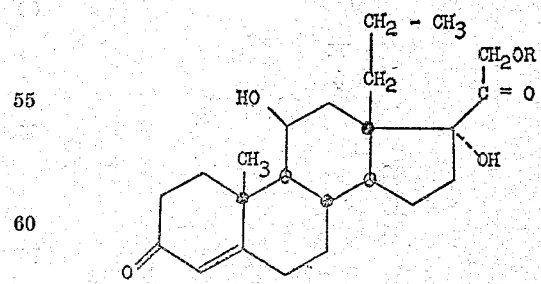

wherein R is selected from the group consisting of hydrogen, the acyl radical of an organic carboxylic acid having from 1 to 18 carbon atoms, the acyl radical of a mineral acid and alkyl having from 1 to 18 carbon atoms, is produced by the following steps which are depicted in Table I.
TABLE I
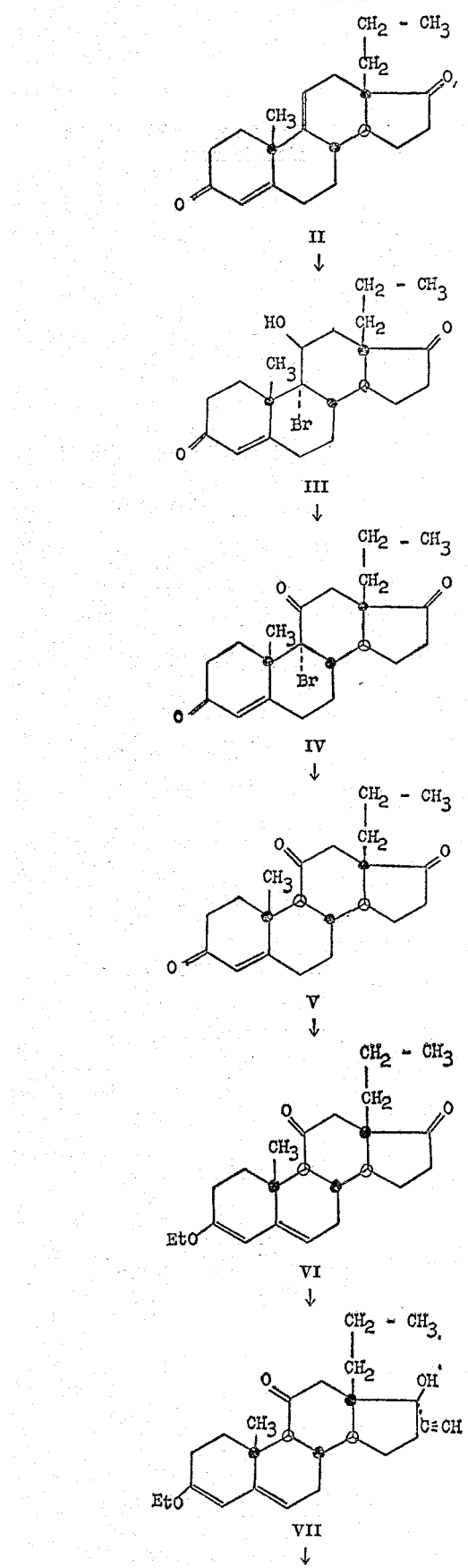
TABLE I—Continued
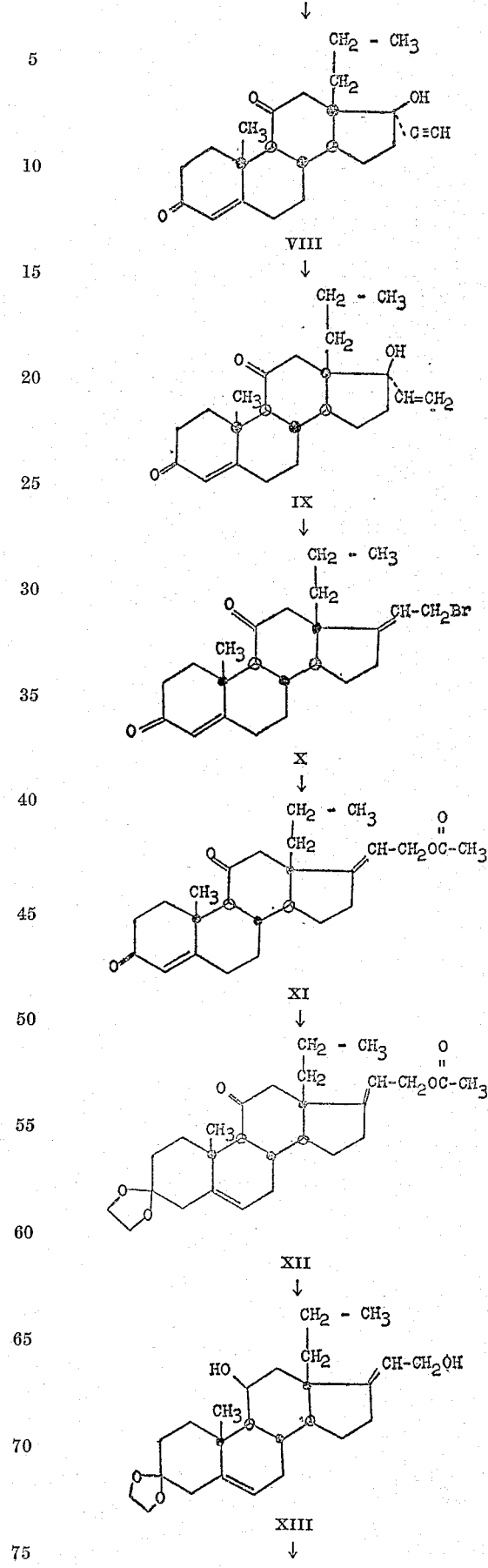

TABLE I—Continued

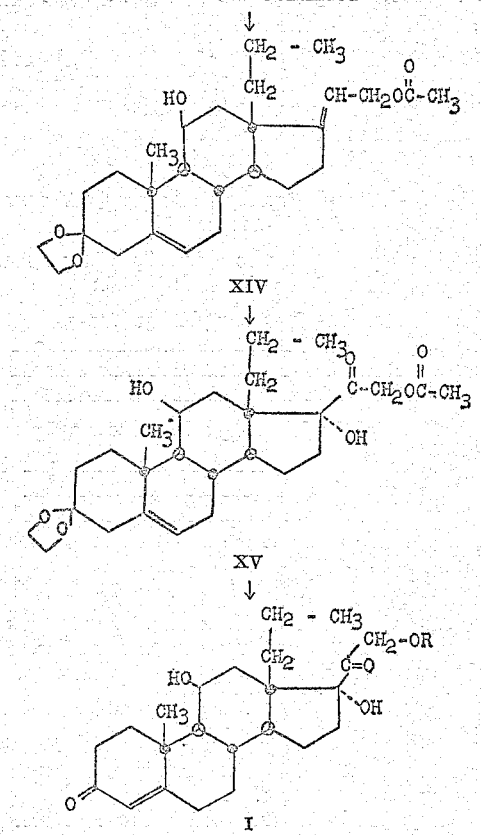

Et is the ethyl radical
R has the above-assigned meanings

This process consists in the steps of (a) Reacting 10β-methyl-13β-n-propyl-Δ⁴,⁹⁽¹¹⁾-gonadiene-3,17-dione with N-bromosuccinimide in the presence of an inert organic solvent, (b) Oxidizing the 9α-bromo-10β-methyl-13β-n-propyl-Δ⁴-gonene-11β-ol-3,17-dione, (c) Reducing the 9α-bromo-10β-methyl-13β-n-propyl-Δ⁴-gonene-3,11,17-trione by the action of zinc and acetic acid, (d) Enolyzing the ketone in the 3-position of 10β-methyl-13β-n-propyl-Δ⁴-gonene-3,11,17-trione by the formation of the 3-ethyl ether, (e) Ethynylating the 3-ethoxy-10β-methyl-13β-n-propyl-Δ³,⁵-gonadiene-11,17-dione, (f) Hydrolyzing the 3-ethoxy-10β-methyl-13β-n-propyl-17α-ethynyl-Δ³,⁵-gonadiene-17β-ol-11-one by the action of an acid, (g) Reducing the 10β-methyl-13β-n-propyl-17α-ethynyl-Δ⁴-gonene-17β-ol-3,11-dione by catalytic hydrogenation, (h) Brominating the 10β-methyl-13β-n-propyl-17α-vinyl-Δ⁴-gonene-17β-ol-3,11-dione, (i) Reacting the 10β-methyl-13β-n-propyl-17-(2'-bromo)-ethylidene-Δ⁴-gonene-3,11-dione with an alkali metal acetate in an inert organic solvent, (j) Ketalizing the 10β-methyl-13β-n-propyl-17-(2'-acetoxy)-ethylidene-Δ⁴-gonene-3,11-dione with the formation of a 3-ethylene ketal, (k) Reacting the 3-ethylenedioxy-10β-methyl-13β-n-propyl-17-(2'-acetoxy)-ethylidene-Δ⁵-gonene-11-one with lithium aluminum hydride in an inert organic solvent, (l) Acetylating the 3-ethylenedioxy-10β-methyl-13β-n-propyl-17-(2'-hydroxy)-ethylidene-Δ⁵-gonene-11β-ol by the action of an acetylating agent in an inert organic solvent, (m) Reacting the 3-ethylenedioxy-10β-methyl-13β-n-propyl-17-(2'-acetoxy)-ethylidene-Δ⁵-gonene-11β-ol with osmium tetra-oxide and a peroxide of a tertiary amine oxide in the presence of a tertiary alcohol, (n) Hydrolyzing the 3-ethylenedioxy-10β-methyl-13β-n-propyl-17-(1'-oxo-2'-acetoxy)-ethyl-Δ⁵-gonene-11β-17α-diol by the action of an organic carboxylic acid, and (o) Recovering said 13β-n-propyl-18-nor-hydrocortisone.

The process through step (n) leads to the acetate of 13β-n-propyl-18-nor-hydrocortisone [or 10β-methyl-13β-n-propyl-17-(1'-oxo-2'-acetoxy)-ethyl-Δ⁴-gonene-11β, 17α-diol-3-one], compound I with R=—COCH₃. This compound is saponified into the corresponding 21-alcohol, compound I with R=H, and transformed, if desired, into any other desired ester or ether by conventional methods.

The starting compound, 10β-methyl-13β-n-propyl-Δ⁴,⁹⁽¹¹⁾-gonadiene-3,17-dione, II, is prepared according to the process described in our copending parent U.S. application Ser. No. 174,252, now U.S. Patent No. 3,119,841. Preparation of this compound is also described in Belgian Patent No. 614,522.

According to a preferred process of the invention:

(a) N-bromosuccinimide is made to react on 10β-methyl-13β-n-propyl-Δ⁴,⁹⁽¹¹⁾-gonadiene-3,17-dione, II, in acetone as the organic solvent at temperatures between about 0° C. and about room temperature;

(b) The oxidizing agent employed in order to oxidize 9α-bromo-10β-methyl-13β-n-propyl-Δ⁴-gonene-11β-ol-3,17-dione, III, is chromic acid anhydride in an acidic media such as acetic acid and sulfuric acid at temperatures between about 0° C. and about room temperature;

(c) The reaction of 9α-bromo-10β-methyl-13β-n-propyl-Δ⁴-gonene-3,11,17-trione, IV, with zinc in the presence of acetic acid is conducted at temperatures between about 0° C. and about room temperature;

(d) The ketone in the 3-position of 10β-methyl-13β-n-propyl-Δ⁴-gonene-3,11,17-trione, V, is protected by the action of ethyl orthoformiate on this compound, while operating in an alcoholic media, preferably a lower alkanol such as ethanol, and in the presence of small amounts of p-toluenesulfonic acid;

(e) The ethynylation agent employed in order to obtain 3-ethoxy-10β-methyl-13β-n-propyl-17α-ethynyl-Δ³,⁵-gonadiene-17β-ol-3-one, VII, is an ethynylmagnesium halide and particularly the bromide, the reaction is conducted in a mixture of ether and tetrahydrofuran as the inert organic solvent;

(f) The acid hydrolysis of 3-ethoxy-10β-methyl-13β-n-propyl-17α-ethynyl-Δ³,⁵-gonadiene-17β-ol-11-one, VII, is effected with the aid of hydrochloric acid in alcoholic solution, preferably a lower alkanol such as ethanol;

(g) The catalytic reduction of 10β-methyl-13β-n-propyl-17α-ethynyl-Δ⁴-gonene-17β-ol-3,11-dione, VIII, is effected with hydrogen in the presence of catalyst having a palladium base such as a 5% palladium on calcium carbonate while operating in a mixture of tetrahydrofuran and dimethylformamide;

(h) The reaction between 10β-methyl-13β-n-propyl-17α-vinyl-Δ⁴-gonene-17β-ol-3,11-dione, IX, and the preferred brominating agent, phosphorus bromide is conducted in chloroform as inert organic solvent;

(i) 10β-methyl-13β-n-propyl-17-(2'-bromo)-ethylidene-Δ⁴-gonene-3,11-dione, X, is made to react with an alkali metal acetate, such as potassium acetate, while operating in acetone as an inert organic solvent;

(j) The ketone in the 3-position of 10β-methyl-13β-n-propyl-17-(2'-acetoxy)-ethylidene-Δ⁴-gonene-3,11-dione, XI, is transformed into the ethylene-ketal by causing this compound to react with ethylene glycol in the presence of p-toluene sulfonic acid as catalyst, while conducting the reaction in a benzenic media at reflux temperatures;

(k) The reduction of 3-ethylenedioxy-10β-methyl-13β-n-propyl-17-(2'-acetoxy)-ethylidene-Δ⁵-gonene-11-one, XII, by lithium-aluminum hydride is effected in an ethereal solution;

(l) The hydroxyl in the lateral chain of 3-ethylenedioxy-10β-methyl-13β-n-propyl-17-(2'-hydroxy)-ethylidene-$\Delta^5$-gonene-11$\beta$-ol, XIII, is re-acetylated by acetic acid anhydride while operating in pyridine;

(m) The hydroxylizing oxidization of 3-ethylenedioxy-10$\beta$ - methyl - 13$\beta$-n-propyl-17-(2'-acetoxy)-ethylidene-$\Delta^5$-gonene-11$\beta$-ol, XIV, is effected by the action of osmium tetraoxide and a peroxide of a tertiary amine oxide, such as the peroxide of triethylamine oxide, in t-butanol;

(n) The acid hydrolysis of 3-ethylenedioxy-10$\beta$-methyl-13$\beta$ - n - propyl-17-(1'-oxo-2'-acetoxy)-ethyl-$\Delta^5$-gonene-11$\beta$,17$\alpha$-diol, XV, is effected by the action of aqueous acetic acid.

The 21 acetate of 13$\beta$-n-propyl-18-nor-hydrocortisone [or 10$\beta$-methyl-13$\beta$-n-propyl-17-(1'-oxo-2'-acetoxy)-ethyl-$\Delta^4$-gonene-11$\beta$,17$\alpha$-diol], I, R=COCH$_3$, can be saponified by conventional methods to give 13$\beta$-n-propyl-18-nor-hydrocortisone, I, R=H. The alcohol function in the 21-position of this latter compound can be esterified again by a functional derivative of a mineral or organic carboxylic acid such as nitric acid, phosphoric acid and organic carboxylic acids having from 1 to 18 carbon atoms, such as the alkanoics and alkenoics, for example, acetic acid, trimethylacetic acid, propionic acid, 4,4-dimethylpentanoic acid, 10-undecenoic acid; the cycloalkyl-alkanoic acids, for example, $\beta$-cyclopentyl-propionic acid; the aryl-alkanoic acids, for example, phenyl-propionic acid; the cycloalkanoic acids, for example, hexahydrobenzoic acid, hexahydroterephthalic acid, other phenyl-carboxylic acids, halobenzoic acids, 3,5-dinitrobenzoic acid, and naphthoic acids. Such other esters are prepared by reacting the corresponding esterifying acid derivatives such as the acid, acid chloride, or acid anhydride under conventional methods. In addition, the alcohol function in the 21-position of 13$\beta$-n-propyl-18-nor-hydrocortisone can be etherified to give ethers in the 21-position with alkyl radicals having from 1 to 18 carbon atoms such as the methyl ether, the ethyl ether, the stearyl ether, etc.

It is also obvious that one can vary the nature of the solvents, the temperatures or the duration of the reactions without thereby modifying the nature of the invention.

The process of the invention is distinguished by the ease of conducting the various reactions. In particular, it was found that the hydroxylizing oxidization of the lateral chain in the 17-position must be effected in this series on a derivative whose double bond in the ring A is no longer conjugated with the ketone in the 3-position; this is realized by the transformation of the 3-ketone into the ethylene-ketal.

The following example is given as purely indicative of the invention. It is obvious that other expedients known to those skilled in the art may be employed without departing from the spirit of the invention. The temperatures indicated are expresed in degrees centigrade.

EXAMPLE I.—PREPARATION OF 10$\beta$-METHYL-13$\beta$-n-PROPYL-17-(1'-OXO-2'-ACETOXY) - ETHYL-$\Delta^4$-GONENE-11$\beta$,17$\alpha$-DIOL - 3 - ONE, COMPOUND I, R=COCH$_3$.

Step A.—9$\alpha$-bromo-10$\beta$-methyl - 13$\beta$-n-propyl-$\Delta^4$-gonene-11$\beta$-ol-3,17-dione, III 0.525 g. of N-bromosuccinimide were dissolved in 9 cc. of acetone. The solution obtained was cooled to +10° C. 0.700 g. of 10$\beta$-methyl-13$\beta$-n-propyl-$\Delta^{4,9(11)}$-gonadiene-3,17-dione, II (obtained according to Belgian Patent 614,522) was added thereto, then under an atmosphere of nitrogen 1.75 cc. of the following solution were added:

| | Cc. |
|---|---|
| Concentrated perchloric acid | 1.7 |
| Water | 6 |

The mixture was agitated for a period of 10 minutes at +10° C., then poured into a mixture of water and ice. The precipitate was vacuum filtered, washed with acetone containing 50% water, then with water, dried and evaporated to dryness under vacuum.

0.917 g. (quantitative yield) of 9$\alpha$-bromo-10$\beta$-methyl-13$\beta$-n-propyl-$\Delta^4$-gonene-11$\beta$-ol-3,17-dione, III, were obtained having a melting point of 220° C. This compound was utilized as such for the following step of the synthesis.

This compound is not described in the literature.

Step B.—9$\alpha$-bromo-10$\beta$-methyl-13$\beta$-n-propyl-$\Delta^4$-gonene-3,11,17-trione, IV The following mixture was agitated under an atmosphere of nitrogen while cooling to +10° C.:

| | | |
|---|---|---|
| 9$\alpha$-bromo-10$\beta$-methyl-13$\beta$-n-propyl-$\Delta^4$-gonene-11$\beta$-ol-3,17-dione, III | g | 1 |
| Acetone | cc | 4 |
| Acetic acid | cc | 5.3 | thereafter 1 cc. of the following solution was added:

| | | |
|---|---|---|
| Chromic acid anhydride | g | 2.67 |
| Concentrated sulfuric acid | cc | 2.3 |
| Water sufficient to make | cc | 10 |

The reaction mixture was agitated for a period of one-half hour at +10° C. Then, 0.5 cc. of methanol was added thereto, and the mixture was agitated for a period of one-quarter hour more. Thereafter, the reaction mixture was poured into a mixture of water and ice. The precipitate was vacuum filtered, washed with water and evaporated to dryness under vacuum.

0.820 g. (yield 90%) of 9$\alpha$-bromo-10$\beta$-methyl-13$\beta$-n-propyl-$\Delta^4$-gonene-3,11,17-trione, IV, were obtained having a melting point of 215° C. This product was used as such for the following step.

This compound is not described in the literature.

Step C.—10$\beta$-methyl-13$\beta$-n-propyl-$\Delta^4$-gonene-3,11,17-trione, V 0.820 g. of 9$\alpha$-bromo-10$\beta$-methyl - 13$\beta$ - n - propyl-$\Delta^4$-gonene-3,11,17-trione, IV, were dissolved in 15 cc. of 90% acetic acid. The solution was cooled to +10° C. and 0.35 g. of zinc powder was added under an atmosphere of nitrogen. The reaction mixture was agitated for a period of 10 minutes and filtered. The filtrate was reduced to a small volume and poured onto a mixture of water and ice. The precipitate was vacuum filtered, dried and evaporated to dryness under vacuum. 0.595 g. of 10$\beta$-methyl-13$\beta$-n-propyl-$\Delta^4$ - gonene - 3,11,17 - trione, V, were recovered.

After crystallization 0.380 g. of a product melting at 220° C. and having a specific rotation $$[\alpha]_D^{20} = +259.6° \pm 1°$$

(c.=0.4% in methanol) were obtained with a yield of 57.5%.

The product occurred in a form of white crystals insoluble in water and soluble in alcohol and benzene.

Analysis.—C$_{21}$H$_{28}$O$_3$; molecular weight=328.44. Calculated: C, 76.79%; H, 8.59%. Found: C, 76.6%; H, 8.5%.

This compound was not described in the literature before our invention.

Step D.—3-ethoxy-10$\beta$-methyl-13$\beta$-n-propyl-$\Delta^{3,5}$-gonadiene-11,17-dione, VI The following mixture was agitated under an atmosphere of nitrogen:

| | | |
|---|---|---|
| 10$\beta$-methyl-13$\beta$-n-propyl-$\Delta^4$-gonene-3,11,17-trione, V | g | 1.500 |
| Ethanol | cc | 7.5 |
| Ethyl orthoformiate | cc | 1.5 |

The mixture was heated to 80° C. and 1.5 cc. of the following solution was added:

| | | |
|---|---|---|
| p-Toluenesulfonic acid | mg | 22.5 |
| Ethanol | cc | 50 |

The temperature was maintained at 80° C. for a period of 15 minutes and then 0.6 cc. of triethylamine and 6 cc. of cold water was added, drop by drop. The mixture was iced overnight. The precipitate was vacuum filtered, washed and dried under vacuum.

1.456 g. (yield 90%) of 3-ethoxy-10β-methyl-13β-n-propyl-$\Delta^{3,5}$-gonadiene-11,17-dione, VI, were obtained having a melting point of 146° C., and a specific rotation $[\alpha]_D^{20} = 0°$ to $-4°$ (c.=0.4% in ethanol containing 1% pyridine).

The product occurred in the form of white crystals and was insoluble in water, soluble in alcohol, and very soluble in chloroform.

This compound was not described in the literature before our invention.

Step E.—3-ethoxy-10β-methyl-13β-n-propyl-17α-ethynyl-$\Delta^{3,5}$-gonadiene-17β-ol-11-one, VII (A) *Preparation of the magnesium reagent.*—Methyl bromide was passed, bubble by bubble, into 160 cc. of ethyl ether in the presence of 10 g. of magnesium turnings, while allowing the reaction to occur at the reflux temperature. Next, the reaction mixture was cooled to room temperature. A solution of methylmagnesium bromide was obtained with a concentration of 2.32 mols per liter.

100 cc. of the solution of methylmagnesium bromide and 250 cc. of tetrahydrofuran were heated to 30° C. under an atmosphere of nitrogen and a stream of acetylene was passed therethrough, bubble by bubble, over a period of 3 hours. A solution of ethynylmagnesium bromide was obtained with a concentration of about 0.6 mols/liter.

(B) *Grignard reaction.*—1.430 g. of 3-ethoxy-10β-methyl-13β-n-propyl-$\Delta^{3,5}$-gonadiene-11,17-dione, VI, were added to the solution of ethynylmagnesium bromide, obtained above. The reaction mixture was then heated to reflux while very slowly bubbling acetylene therethrough for a period of two hours. Next, the reaction mixture was cooled and 300 cc. of a saturated solution of ammonium chloride was added thereto. The mixture was extracted with ether. The extract was washed with water, and evaporated to dryness under vacuum.

1.723 g. of 3-ethoxy-10β-methyl-13β-n-propyl-17α-ethynyl-$\Delta^{3,5}$-gonadiene-17β-ol-11-one, VII, were obtained. This product was utilized as such for the next step of the synthesis.

This compound is not described in the literature.

Step F.—10β-methyl-13β-n-propyl-17α-ethynyl-$\Delta^4$-gonene-17β-ol-3,11-dione, VIII 3-ethoxy-10β-methyl-13β-n-propyl-17α-ethynyl-$\Delta^{3,5}$-gonadiene-17β-ol-11-one, VII, as obtained above (1.723 g.), were dissolved in 11.2 cc. of ethanol and the reaction mixture was heated to 55° C. under an atmosphere of nitrogen. 1.7 cc. of normal aqueous hydrochloric acid were added thereto. The mixture was agitated for a period of 5 minutes and poured into 150 cc. of water. The precipitate was vacuum filtered, washed and dried under vacuum. The residue was dissolved in methylene chloride and subjected to chromatography through magnesium silicate. The column was eluted with methylene chloride and the product was crystallized from isopropyl ether. 0.735 g. of 10β-methyl-13β-n-propyl-17α-ethynyl-$\Delta^4$-gonene-17β-ol-3,11-dione, VIII, were obtained, having a melting point of 220° C., and a specific rotation $[\alpha]_D^{20} = +113.5° \pm 1°$ (c.=0.5% in methanol) which product was crystallized from ethanol.

The product occurred in the form of white crystals, insoluble in water, and soluble in chloroform.

*Analysis.*—$C_{23}H_{30}O_3$; molecular weight=354.47. Calculated: C, 77.92%; H, 8.53%. Found: C, 77.8%; H, 8.6%.

This compound was not described in the literature before our invention.

Step G.—10β-methyl-13β-n-propyl-17α-vinyl-$\Delta^4$-gonene-17β-ol-3,11-dione, IX 4.05 g. of 10β-methyl-13β-n-propyl-17α-ethynyl-$\Delta^4$-gonene-17β-ol-3,11-dione, VIII, were introduced into a mixture of 75 cc. of tetrahydrofuran, 75 cc. of dimethylformamide and 8.2 cc. of pyridine. 0.275 g. of calcium carbonate containing 5% of palladium were added thereto and the mixture was hydrogenated until the end of the absorption of hydrogen (250 cc.). The catalyst was filtered. The filtrate was concentrated to a small volume, poured on a mixture of water and ice and acidified to a pH of 3 with normal hydrochloric acid.

The precipitate was vacuum filtered and thereafter washed with an aqueous solution of sodium bicarbonate, and then with water, and dried. 3.785 g. of product were obtained.

The product obtained was dissolved in methylene chloride and filtered through a bed of magnesium silicate. The filtrate was then evaporated to dryness under vacuum.

The product obtained was dissolved in 8 cc. of methylene chloride, 25 cc. of isopropyl ether were added thereto and the solution was concentrated to one-third of its volume. Thereafter the concentrated solution was iced and vacuum filtered to obtain 3.51 g. of 10β-methyl-13β-n-propyl-17α-vinyl-$\Delta^4$-gonene-17β-ol-3,11-dione, IX, having a melting point of 200° C. This compound occurred in the form of white needles, insoluble in water, soluble in alcohols, and very soluble in acetone, benzene and chloroform.

*Analysis.*—$C_{23}H_{32}O_3$; molecular weight=356.49. Calculated: C, 77.48%; H, 9.04%. Found: C, 77.2%; H, 8.9%.

This compound was not described in the literature before our invention.

Step H.—10β-methyl-13β-n-propyl-17-(2'-bromo)-ethylidene-$\Delta^4$-gonene-3,11-dione, X 0.25 g. of phosphorus bromine were placed in a solution of 5 cc. of chloroform. The reaction mixture was agitated while bubbling nitrogen therethrough at a temperature of −18° C., and, in the space of 5 minutes, 0.6 g. of 10β-methyl-13β-n-propyl-17α-vinyl-$\Delta^4$-gonene-17β-ol-3,11-dione, IX, in 8 cc. of chloroform containing 0.3 cc. of a 10% pyridine solution in chloroform were introduced.

The reaction mixture was agitated for a period of 15 hours at room temperature, then washed with water, with 0.1 N sulfuric acid, with a solution of sodium bicarbonate, then again with water. Thereafter the solution was distilled to dryness under vacuum. The product obtained was taken up in isopropyl ether, heated to reflux and filtered. The filtrate was concentrated to half its volume, iced and vacuum filtered. 0.501 g. of 10β-methyl-13β-n-propyl-17-(2'-bromo)-ethylidene-$\Delta^4$-gonene-3,11-dione, X, were obtained having a melting point of 155° C. (yield 71%). This product occurred in the form of prismatic crystals.

This compound was not described in the literature before our invention.

Step I.—10β-methyl-13β-n-propyl-17-(2'-acetoxy)-ethylidene-$\Delta^4$-gonene-3,11-dione, XI 17 g. of potassium acetate were placed in solution in 900 cc. of acetone. The mixture was agitated rapidly for a period of five minutes in an atmosphere of nitrogen and then 4.98 g. of 10β-methyl-13β-n-propyl-17-(2'-bromo)-ethylidene-$\Delta^4$-gonene-3,11-dione, X, were introduced. The agitation was continued under an atmosphere of nitrogen for a period of 18 hours at room temperature. Thereafter, the product was isolated, after vacuum filtering to remove the potassium bromide, by distillation to dryness of the filtrate. The residue was then placed in solution in methylene chloride and subjected to chromatography through magnesium silicate. On elution with methylene chloride containing 1% of acetone, 4 g. of 10β-methyl - 13β - n - propyl - 17-(2′-acetoxy)-ethylidene-Δ⁴-gonene-3,11-dione, XI, were obtained. The product was utilized as such for the following step of the preparation:
Ultraviolet Spectra (ethanol): maximum at $$238\ m\mu\ E_{1\ cm}^{1\%} = 384\ \epsilon = 15{,}300$$

This compound was not described in the literature before our invention.

*Step J.—3-ethylenedioxy-10β-methyl-13β-n-propyl-17-(2′-acetoxy)-ethylidene-Δ⁵-gonene-11-one, XII*

0.735 g. of 10β-methyl-13β-n-propyl-17-(2′-acetoxy)-ethylidene-Δ⁴-gonene-3,11-dione, XI, were introduced into 45 cc. of benzene. 2.5 cc. of ethyleneglycol and 0.035 g. of p-toluenesulfonic acid were added thereto. The reaction mixture was heated to reflux while agitating under an atmosphere of nitrogen for a period of five hours. During the course of the heating, 2–3 cc. of ethyleneglycol were re-added to the mixture.

The reaction mixture was then cooled and a sodium bicarbonate solution added thereto. The solution was extracted with ether. The extract was washed with water and evaporated to dryness under vacuum. A product was recovered which was subject to chromatography, in solution in methylene chloride, through magnesium silicate. On elution with methylene chloride containing 2% of ether, 0.625 g. of 3-ethylenedioxy-10-β-methyl-13β-n-propyl-17-(2′-acetoxy)-ethylidene-Δ⁵-gonene-11-one, XII, were obtained.

This compound is not described in the literature.

*Step K.—3-ethylenedioxy-10β-methyl-13β-n-propyl-17-(2′-hydroxy)-ethylidene-Δ⁵-gonene-11β-ol, XIII*

0.85 g. of lithium-aluminum hydride were placed in suspension in 35 cc. of anhydrous ether. The suspension was agitated under an atmosphere of nitrogen at room temperature, and, slowly, a solution of 0.61 g. of 3-ethylenedioxy - 10β - methyl - 13β - n - propyl - 17 - (2′-acetoxy)-ethylidene-Δ⁵-gonene-11-one, XII, dissolved in 50 cc. of anhydrous ether, were added thereto.

The agitation was continued for a period of 20 minutes and then the reaction mixture was heated to reflux for a period of one hour. Next, the mixture was cooled to +10° C., and water was added thereto. The precipitated product was vacuum filtered and triturated successively with methanol, ethyl acetate and ether. The organic phases were combined, washed with water, and distilled to dryness under vacuum at a temperature below 40° C.

The product obtained was subject to chromatography in solution in methylene chloride through magnesium silicate. The column was eluted with methylene chloride containing 1% of methanol. The product was then crystallized from n-hexane, heated to reflux. 0.445 g. of 3 - ethylenedioxy-10β-methyl-13β-n-propyl-17-(2′-hydroxy)-ethylidene-Δ⁵-gonene-11β-ol, XIII, were obtained having a melting point of 195° C. with a yield of 79%.

This compound is not described in the literature.

*Step L.—3-ethylenedioxy-10β-methyl-13β-n-propyl-17-(2′-acetoxy)-ethylidene-Δ⁵-gonene-11β-ol, XIV*

0.4 g. of 3-ethylenedioxy-10β-methyl-13β-n-propyl-17-(2′-hydroxy)-ethylidene-Δ⁵-gonene-11β-ol, XIII, were dissolved in 4 cc. of anhydrous pyridine and 2 cc. of acetic acid anhydride. The reaction mixture was allowed to stand in darkness and under an atmosphere of nitrogen for a period of 16 hours, then poured into a cooled, aqueous solution of sodium bicarbonate.

The solution was extracted with ether. The extract was washed with water, and distilled to dryness under vacuum. A product was recovered which was triturated in isopropyl ether. The mixture was heated to reflux, iced, vacuum filtered and dried. 0.375 g. of 3-ethylenedioxy - 10β - methyl - 13β - n - propyl - 17 - (2′ - acetoxy)-ethylidene-Δ⁵-gonene-11β-ol, XIV, was obtained having a melting point of 156° C.

The mother liquors of crystallization in isopropyl ether, concentrated in the cold, allowed the recovery of another 0.025 g. of the same product.

This compound is not described in the literature.

*Step M.—3-ethylenedioxy-10β-methyl-13β-n-propyl-17-(1′-oxo-2′-acetoxy)-ethyl-Δ⁵-gonene-11β,17α-diol, XV*

0.315 g. of 3-ethylenedioxy-10β-methyl-13β-n-propyl-17-(2′-acetoxy)-ethylidene-Δ⁵-gonene-11β-ol, XIV, were dissolved in 16 cc. of t-butanol. 0.45 cc. of a solution of 12 mg. of osmium tetra-oxide in 0.5 cc. of pyridine were added and the reaction mixture was agitated under an atmosphere of nitrogen for a period of 40 minutes at a temperature of 25° C. Next, in the space of one hour, in small fractions, 0.37 g. of the peroxide of triethylamine oxide, with a concentration of 20.9% of active oxygen, were added and the agitation was continued for another half hour at the temperature of 30 to 35° C.

A solution of 0.15 g. of sodium sulfite in 15 cc. of water was then added to the reaction mixture. The mixture was agitated for a period of 5 minutes, then concentrated under vacuum to a small volume. The concentrated solution was extracted with ethyl ether. The extract was washed with water and distilled to dryness. The product, redissolved in methylene chloride, was subject to chromatography through magnesium silicate with elution with methylene chloride containing 2% of acetone.

After evaporation 0.095 g. of 3-ethylenedioxy-10β-methyl - 13β - n - propyl - (1′ - oxo - 2′ - acetoxy) - ethyl-17-Δ⁵-gonene-11β,17α-diol, XV, were obtained having a melting point of 185° to 192° C.

This compound is not described in the literature.

*Step N.—10β - methyl - 13β - n - propyl - 17 - (1′ - oxo - 2′ - acetoxy) - ethyl - Δ⁴ - gonene - 11β,17α - diol - 3 - one, I, R=COCH₃*

0.115 g. of 3-ethylenedioxy-10β-methyl-13β-n-propyl-17 - (1′ - oxo - 2′ - acetoxy) - ethyl - Δ⁵ - gonene - 11β,17α-diol, XV, were introduced into 12.5 cc. of aqueous acetic acid and the reaction mixture was agitated under an atmosphere of nitrogen for a period of one hour at a temperature of 75° C. Thereafter, the reaction mixture was cooled and poured into water. The aqueous mixture was neutralized with sodium bicarbonate. The precipitate was vacuum filtered, washed with water and dried.

The product, dissolved in methylene chloride, was subjected to chromatography through magnesium silicate, with elution with methylene chloride containing 1% of acetone. On recrystallization from isopropyl ether, 0.045 g. of 10β-methyl-13β-n-propyl-17-(1′-oxo-2′-acetoxy)-ethyl-Δ⁴-gonene-11β,17α-diol-3-one, I, R=COCH₃, were obtained having a melting point of 168° C.

The product occurred in the form of white needles, insoluble in water, acids and dilute aqueous alkalis, and soluble in alcohols and benzene.

Infrared spectra (chloroform):

(1) Shows the presence of free and associated OH groups.
(2) Bands at 1745 cm.⁻¹ and 1725 cm.⁻¹ show the 20-one-21-acetate group.
(3) Bands at 1665–1615–860 cm.⁻¹ show the presence of a Δ⁴-3-one group.

Ultraviolet spectra (ethanol):
Maximum 242 mμ ε=15,500

*Analysis.*—$C_{25}H_{36}O_6$; molecular weight equals 432.54. Calculated: C, 69.41%; H, 8.39%. Found: C, 69.6%; H, 8.5%.

This compound is not described in the literature.

This compound, the 21 acetate of 13β-n-propyl-18-nor-hydrocortisone, I with R=COCH₃, was readily hydrolyzed by the action of aqueous methanolic potassium carbonate or bicarbonate at 20° C. to give 13β-n-propyl-18-nor-hydrocortisone (or 10β-methyl-13β-n-propyl-17-(1′ - oxo - 2′ - hydroxy) - ethyl - Δ⁴ - gonene - 11β,17α- diol-3-one), I with R=H. If desired, the 21 alcohol could be esterified or etherified by methods conventional in the steroid art to obtain esters or ethers corresponding to compound I.

It is to be understood that the invention is not limited to the process of the example given above, and other expedients can be employed without departing from the spirit of the invention and the scope of the appended claims.

We claim:

1. 9α - bromo - 10β - methyl - 13β - n - propyl - Δ⁴-gonene-3,11,17-trione.

2. 3 - ethoxy - 10β - methyl - 13β - n - propyl - Δ³,⁵-gonadiene-11,17-dione.

3. 3 - ethoxy - 10β - methyl - 13β - n - propyl - 17α-ethynyl-Δ³,⁵-gonadiene-17β-ol-11-one.

4. 10β - methyl - 13β - n - propyl - 17 - (2' - bromo)-ethylidene-Δ⁴-gonene-3,11-dione.

5. 3 - ethylenedioxy - 10β - methyl - 13β - n - propyl-17-(1'-oxo-2'-acetoxy)-ethyl-Δ⁵-gonene-11β,17α-diol.

6. The process of preparing a 13β-n-propyl-18-nor-hydrocortisone derivative of the formula

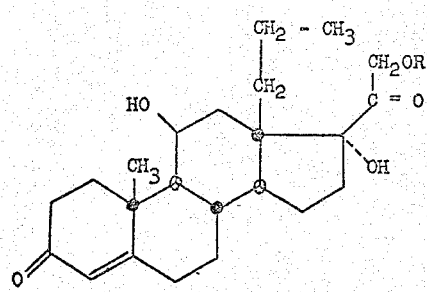

wherein R is selected from the group consisting of hydrogen, the acyl radical of an organic carboxylic acid having from 1 to 18 carbon atoms, the acyl radical of a mineral acid and alkyl having from 1 to 18 carbon atoms, which comprises the steps of (a) reacting 10β - methyl - 13β - n - propyl - Δ⁴,⁹⁽¹¹⁾-gonadiene-3,17-dione with N-bromosuccinimide in the presence of an inert organic solvent, (b) oxidizing the 9α-bromo-10β-methyl-13β-n-propyl-Δ⁴-gonene-11β-ol-3,17-dione, (c) reducing the 9α-bromo-10β-methyl-13β-n-propyl-Δ⁴-gonene-3,11,17-trione, by the action of zinc and acetic acid, (d) enolizing the ketone in the 3 position of 10β-methyl - 13β - n - propyl - Δ⁴ - gonene - 3,11,17 - trione by the formation of 3 ethyl ether, (e) ethynylating the 3-ethoxy-10β-methyl-13β-n-propyl-Δ³,⁵-gonadiene-11,17-dione, (f) hydrolyzing the 3-ethoxy-10β-methyl-13β-n-propyl-17α - ethynyl - Δ³,⁵ - gonadiene - 17β - ol - 11 - one by the action of an acid, (g) reducing the 10β - methyl - 13β - n - propyl - 17α-ethynyl - Δ⁴ - gonene - 17β - ol - 3,11 - dione by catalytic hydrogenation, (h) brominating the 10β - methyl - 13β - n - propyl-17α-vinyl-Δ⁴-gonene-17β-ol-3,11-dione, (i) reacting the 10β - methyl - 13β - n - propyl - 17-(2' - bromo) - ethylidene - Δ⁴ - gonene - 3,11 - dione with an alkali metal acetate in an inert organic solvent, (j) ketalizing the 10β - methyl - 13β - n - propyl - 17-(2' - acetoxy) - ethylidene - Δ⁴ - gonene - 3,11-dione, with the formation of a 3-ethylene ketal, (k) reacting the 3 - ethylenedioxy - 10β - methyl - 13β-n - propyl - 17 - (2' - acetoxy) - ethylidene - Δ⁵-gonene-11-one, with litium aluminum hydride in an inert organic solvent, (l) acetylating the 3 - ethylenedioxy - 10β - methyl-13β - n - propyl - 17 - (2' - hydroxy) - ethylidene-Δ⁵-gonene-11β-ol, by the action of an acetylating agent in an inert organic solvent, (m) reacting the 3 - ethylenedioxy - 10β - methyl - 13β-n - propyl - 17 - (2' - acetoxy) - ethylidene - Δ⁵-gonene-11β-ol with osimum tetra-oxide and a peroxide of a tertiary amine oxide in the presence of a tertiary alcohol, (n) hydrolyzing the 3 - ethylenedioxy - 10β - methyl-13β - n - propyl - 17 - (1' - oxo - 2' - acetoxy) - ethyl-Δ⁵-gonene-11β,17α-diol, by the action of an organic carboxylic acid, and (o) recovering said 13β - n - propyl - 18 - nor-hydrocortisone derivative.

7. The process of claim 6, step (a), wherein said inert organic solvent is acetone.

8. The process of claim 6, step (b), wherein said 9α-bromo - 10β - methyl - 13β - n - propyl - Δ⁴ - gonene-11β-ol-3,17-dione is oxidized by the action of chromic acid anhydride in an acidic media.

9. The process of claim 6, step (d), wherein the ketone in the 3-position of 10β-methyl-13β-n-propyl-Δ⁴-gonene-3,11,17-trione is enolized into the 3-ethyl ether by the action of ethyl orthoformiate while operating in an alcoholic media and in the presence of very small amounts of p-toluene sulfonic acid.

10. The process of claim 6, step (e), wherein the 3-ethoxy - 10β - methyl - 13β - n - propyl - Δ³,⁵ - gonadiene-11,17-dione is ethynylated by the action of ethynylmagnesium bromide in the presence of a mixture of ether and tetrahydrofuran.

11. The process of claim 6, step (f), wherein said acid is hydrochloric acid in an alcoholic solution.

12. The process of claim 6, step (g), wherein said catalytic hydrogenation is effected in the presence of a catalyst based on palladium while operating in a mixture of tetrahydrofuran and dimethylformamide.

13. The process of claim 6, step (h), wherein said 10β-methyl - 13β - n - propyl - 17α - vinyl - Δ⁴ - gonene - 17β-ol-3,11-dione is brominated by the action of phosphorus bromide in chloroform.

14. The process of claim 6, step (i), wherein said alkali metal acetate in an inert organic solvent is potassium acetate in acetone.

15. The process of claim 6, step (j), wherein the ketone function in the 3 position of 10β-methyl-13β-n-propyl-17-(2' - acetoxy) - ethylidene - Δ⁴ - gonene - 3,11 - dione is transformed into an ethylene ketal by reaction with ethyleneglycol in the presence of p-toluene sulfonic acid and benzene.

16. The process of claim 6, step (k), wherein said inert organic solvent is ether.

17. The process of claim 6, step (l), wherein said acetylating agent in an inert organic solvent is acetic acid anhydride in pyridine.

18. The process of claim 6, step (m), wherein said tertiary alcohol is t-butanol.

19. The process of claim 6, step (n), wherein said organic carboxylic acid is aqueous acetic acid.

References Cited by the Examiner

UNITED STATES PATENTS

| | | | |
|---|---|---|---|
| 2,731,479 | 1/56 | Marshall | 260—397.45 |
| 2,752,366 | 6/56 | Hogg et al. | 260—397.1 |
| 2,880,204 | 3/59 | Fonken et al. | 260—239.55 |

OTHER REFERENCES

Fieser et al.: Steroids, pp. 606 and 607 (1959), Reinhold Pub. Co., New York.

Lenhard et al.: J.A.C.S. 77, pp. 6665–7 (1955).

Pesez: C.A. 49, Col. 5125(d), 1955.

LEWIS GOTTS, *Primary Examiner.*